(12) United States Patent
Dotan et al.

(10) Patent No.: US 8,782,174 B1
(45) Date of Patent: Jul. 15, 2014

(54) UPLOADING AND DOWNLOADING UNSECURED FILES VIA A VIRTUAL MACHINE ENVIRONMENT

(75) Inventors: Yedidya Dotan, Tel Aviv (IL); Ayelet Levin, Pardes Hanna Karkur (IL); Boris Kronrod, Netania (IL)

(73) Assignee: EMC Corporation, Hopkinton, MA (US)

( * ) Notice: Subject to any disclaimer, the term of this patent is extended or adjusted under 35 U.S.C. 154(b) by 442 days.

(21) Appl. No.: 13/077,103

(22) Filed: Mar. 31, 2011

(51) Int. Cl.
*G06F 15/16* (2006.01)

(52) U.S. Cl.
USPC .......................................... 709/219

(58) Field of Classification Search
CPC . H04L 63/1408; H04L 63/1416; H04L 29/04; G06F 21/554; G06F 21/566
USPC .......... 709/219; 726/13, 22–25; 713/187, 188
See application file for complete search history.

(56) References Cited

U.S. PATENT DOCUMENTS

| | | | |
|---|---|---|---|
| 7,080,407 B1 * | 7/2006 | Zhao et al. ...................... 726/24 |
| 2005/0114784 A1 * | 5/2005 | Spring et al. .................. 715/762 |
| 2005/0273849 A1 | 12/2005 | Araujo et al. |
| 2006/0123062 A1 | 6/2006 | Bobbitt et al. |
| 2007/0174915 A1 | 7/2007 | Gribble et al. |
| 2008/0013365 A1 | 1/2008 | Yueh |
| 2009/0070595 A1 | 3/2009 | Delia et al. |
| 2009/0150988 A1 | 6/2009 | Love et al. |
| 2009/0182803 A1 | 7/2009 | Barton et al. |
| 2010/0115023 A1 | 5/2010 | Peled |
| 2010/0205393 A1 | 8/2010 | Yueh |
| 2010/0251329 A1 * | 9/2010 | Wei ................................... 726/1 |
| 2012/0042365 A1 | 2/2012 | Shoval et al. |

OTHER PUBLICATIONS

Jammalamadaka, Ravi Chandra et al., "Delegate: A Proxy Based Architecture for Secure Website Access from an Untrusted Machine", Proceedings of the 22nd Annual Computer Security Applications conference (ACSAC '06), 2006, 10 pages.

* cited by examiner

*Primary Examiner* — Phuoc Nguyen
*Assistant Examiner* — Davoud Zand
(74) *Attorney, Agent, or Firm* — BainwoodHuang (57) ABSTRACT

Methods, computer program products, and apparatuses are provided for securely exchanging a data file between a client machine and a remote application server (e.g., a banking application operating on a banking server) in the context of a user communicating with the remote application server through a secure virtualized environment running on a virtualization server.

19 Claims, 7 Drawing Sheets

UPLOADING AND DOWNLOADING UNSECURED FILES VIA A VIRTUAL MACHINE ENVIRONMENT

BACKGROUND

Malicious software (malware) is currently a serious threat to both commercial and retail online banking. As many as one in four computers in the US is infected by malware. The malware most relevant to online banking fraud are of the Trojan horse variety (Trojans). These install themselves on user machines and then may enable a controller to record data from an infected machine (e.g., key loggers), listen in on conversations (e.g., Man in The Middle or MiTM), or even hijack an HTTP session from within a browser (e.g., Man in The Browser or MiTB).

Trojans, as their name implies, are not perceived by the user. They are able to record keyboard entries at given web sites, and thereby steal the users' userIDs and passwords. They are also able to change transactions as they occur, thus the user may think he is performing a legitimate transaction (e.g., paying a bill) but in reality he is sending money to an offshore account. Trojans also allow session hijacking, whereby a remote fraudster performs transactions via the user's infected machine.

This invisible presence allows Trojans to circumvent most current strong authentication models (e.g. one time passwords and certain out of band interactions). In particular, it may be possible for a fraudster to use Trojans both to steal credentials and clean out accounts. For example, in a MiTB attack, a fraudster may use a key logger to steal the user identifier (and, sometimes the confidential password) from a bank and hijack the individual's account by secretly altering user transactions while presenting fictitious transaction confirmation data to the user. Furthermore, the fraudster may take over user's account and clean out his checking account.

In some secure models, users work from a secure virtual environment, taking the form of a disposable virtualized browser environment, which prevents direct interaction between the malware and the online banking site. Such operation protects users from identity theft and misuse of credit information. A user of a bank may download a client interface to the disposable browser environment using strong authentication methods such as an out-of-band phone call or a one-time-password generated by a token to enable the downloading of the interface. The user may also use a secure login process, which includes an authentication server authenticating users of a banking site. A similar approach is described in pending U.S. patent application Ser. No. 12/854,641 by Asaf Shoval, Orit Yaron, and Yedidya Dotan, filed on Aug. 11, 2010, the teaching and contents of which are fully incorporated herein by this reference.

SUMMARY

One potential drawback to the approach described above is that a user may wish to exchange a data file with a secure site such as a banking site. For example, since the user is accessing the banking site through a secure virtualized environment (which operates on a remote machine), he may not be able to access the file stored on his personal machine to send it to the banking site or to download to his personal machine via the secure virtualized environment. Furthermore, since the data file may be infected with malware, it would compromise the security of the system were the user able to directly send the file to the secure site.

In contrast, various embodiments provide techniques for securely sending a data file from a client machine to a remote application server (e.g., a banking application operating on a banking server) in the context of a user communicating with the remote application server through a secure virtualized environment running on a virtualization server. In particular, these techniques involve pulling an uploaded file from a drop server and filtering it before sending it to the remote application server.

One embodiment is directed to a method performed at a content filter server. The method includes (a) pulling a content file from a drop server, the content file having been uploaded to the drop server from a remote client machine, the remote client machine running a client terminal in functional communication with an application running on a remote application server via a VM client running in a protected space on a VM server (b) filtering contents of the content file to remove security threats, thereby generating a filtered file, and (c) sending the filtered file to the application running on the remote application server.

Furthermore, some embodiments are directed to an apparatus constructed and arranged to perform a similar method. Some embodiments are directed to a computer program product including a tangible computer readable storage medium storing instructions which cause a computer to perform a similar method. In some arrangements, the instructions are compiled and linked executable code. In other arrangements, the instructions are scripts or rules which are dynamically translated and then performed by the computer.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Described herein are various embodiments that relate to techniques for performing and facilitating secure communication of an unsecured file between a client-side computing device and a remote application server through a virtual computing environment provided by an intermediate virtualization server. In one embodiment, the application server is a web banking server and the secured communications relate to commercial banking transactions.

The term "functional communication" as used herein refers to communication between two devices or modules, the communication being for a purpose. For example, although two machines connected to the same network may be in communication with each other, they are not in "functional communication" unless they communicate with each other in the context of performing a task. Furthermore, "functional communication" need not be direct—a first machine may be in functional communication with a second machine even though the two machines communicate only through one or more intermediary machines or networks.

Figure 1:
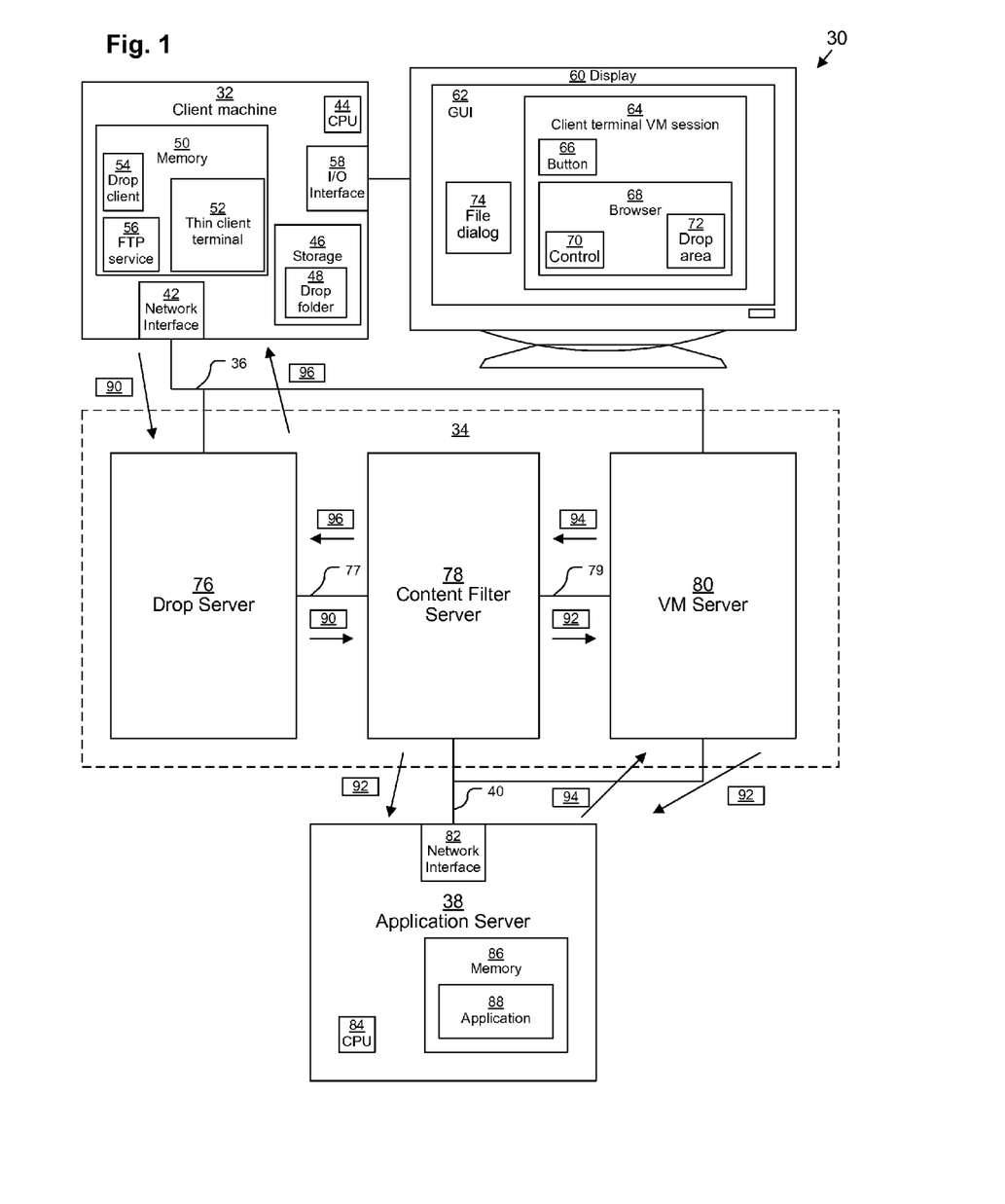
FIG. 1 illustrates an example system for use in practicing various embodiments.

FIG. 1 illustrates a system 30 for use in conjunction with various embodiments. System 30 includes a client machine (or client-side computing device) 32 connected to an intermediate system 34 via connection 36. Client machine 32 may be, for example, a personal computer or a web-enabled tablet or telephone. Connection 36 may be, for example a wide area network (WAN), a local area network (LAN), a point-to-point connection, etc. Intermediate system 34 connects to an application server 38 via connection 40. Connection 40 may be, for example a WAN, a LAN, a point-to-point connection, etc. Connection 40 may include the same network as connection 40, or it may be an entirely separate connection. In a typical embodiment, connection 36 and connection 40 are both provided over the same WAN, for example, the Internet.

Client machine 32 includes a network interface 42 for connecting to connection 36, a central processing unit (CPU) 44, data storage 46, memory 50, and an input/output (I/O) interface 58. CPU 44 may be, for example, a processor, a microprocessor, a collection of multiple processors or microprocessors, or dedicated circuitry. It should be understood that the term "CPU" may include these examples whenever used within this description. Data storage 46 may include any type of non-volatile storage, such as flash memory, magnetic storage, optical storage, or any combination thereof. It should be understood that the term "data storage" may include these examples whenever used within this description. Data storage 46 typically stores files arranged in folders within a file system. One such folder may include drop folder 48. Memory 50 may include any type of volatile or non-volatile storage, such as, random access memory, read-only memory, flash memory, magnetic storage, optical storage, or any combination thereof. It should be understood that the term "memory" may include these examples whenever used within this description. Memory 50 stores a thin client terminal 52 (for providing a remote virtual machine (VM) interface, as will be described in further detail below), which may be executed by CPU 44. Memory 50 also stores data used by client terminal 52. Memory 50 may also store a drop client program 54 and a file-transfer-protocol (FTP) service, both of which may be executed by CPU 44. Memory 50 may also store other well-known elements, such as, for example, an operating system, system settings, and user data. I/O interface 58 connects to display 60. I/O interface may also connect to one or more input devices (such as, for example, a keyboard, keypad, mouse, trackpad, trackball, touch-sensitive device, or any similar devices).

Display 60 presents a graphical user interface (GUI) 62 to a user. GUI 62 displays a client terminal VM session window 64 (controlled by client terminal 52). Client terminal VM session window 64 may display a button 66 (whose use will be described in further detail below, in connection with FIGS. 4 and 6) and a browser 68, such as a web browser for displaying web pages. In some arrangements, when browser 68 displays certain web pages, a control 70 appears within the browser 68. In some arrangements, when browser 68 displays certain web pages, a drop area 72 appears within the browser 68. Control 70 and drop area 72 will be described in further detail below, in connection with FIGS. 4 and 6. GUI 62 may also display a file-selection dialog-box 74. File-selection dialog-box 74 will be described in further detail below, in connection with FIGS. 4 and 6.

Intermediate system 34 includes a drop server 76, a content filter server 78, and a VM server 80. In some embodiments, each of the drop server 76, the content filter server 78, and the VM server 80 are separate machines, which connect to each other via connections 77, 79. Connections 77, 79 may be, for example a WAN, a LAN, a point-to-point connection, etc. Connection 77 may include the same network as connection 79, or they may be entirely separate. Connections 77, 79 may include the same network as connections 36 and 40, or they may be an entirely separate connection. In a typical embodiment, connection 77 and connection 79 are both provided over the same LAN, for example, an intranet. In such embodiments, drop server 76 and VM server 80 both connect to connection 36 to allow direct communication with client machine 32. In addition, content filter server 78 and VM server 80 both connect to connection 40 to allow direct communication with application server 38. Drop server 76, content filter server 78, and VM server 80 are described in further detail below, in connection with FIGS. 2-4. In certain embodiments, each of drop server 76, content filter server 78, and VM server 80 are software programs operating on a single intermediate system server 34, as depicted in further detail in FIG. 5.

It should be understood that although FIG. 1 shows exactly one each of the drop server 76, content filter server 78, and VM server 80, in some embodiments there may be multiple instances of each server, while in other embodiments, some of these servers may be omitted. Furthermore, some of these servers may be replaced with various combinations of other devices that perform similar tasks.

Application server 38 includes a CPU 84 and memory 86. Memory 86 stores an application 88, which runs on CPU 84. Application 88 may be, for example, a web-based financial services application that communicates with a user of client machine 32 via browser 68, running on VM server 80 in a virtualized manner. Memory 86 may also store other well-known elements, such as, for example, an operating system, system settings, and user data.

In one example mode of operation, a client machine 32 may establish a virtual session running on VM server 80 to allow for secured communications between client machine 32 and application 88 via the VM server 80. If a user of the client machine 32 wishes to send a local file (also called a content file) 90 stored in storage 46 to application 88, the user bypasses the virtual session by sending local file 90 to the drop server 76. Content filter server 78 then pulls the content file 90 from the drop server 76, filters it (e.g., by scanning it for malware and/or by converting it to a standardized safe format) to create filtered file 92, and sends filtered file 92 to VM server 80, or, in some embodiments, directly to application server 38. Once VM server 80 has received filtered file 92, the user is able to see filtered file 92 is available within browser window 68 to send to application 88.

In another example mode of operation, a client machine 32 may establish a virtual session running on VM server 80 to allow for secured communications between client machine 32 and application 88 via the VM server 80. If a user of the client machine 32 wishes to download a remote file (also called a requested file) 94 from application 88 to storage 46, the user uses the virtual browser 68 to request requested file 94 from the application 88. Application server 38 sends the requested file 94 to the VM server. Content filter server 78 then pulls the requested file 94 from the VM server 80, filters it (e.g., by scanning it for malware and/or by converting it to a standardized safe format) to create filtered file 96, and sends filtered file 96 to drop server 76. Drop server 76 is then able to send the filtered file 96 to the client machine 32 for storage.

Various elements of system 30 will now be illustrated and described in further detail with respect to FIGS. 2-5.

Figure 2:
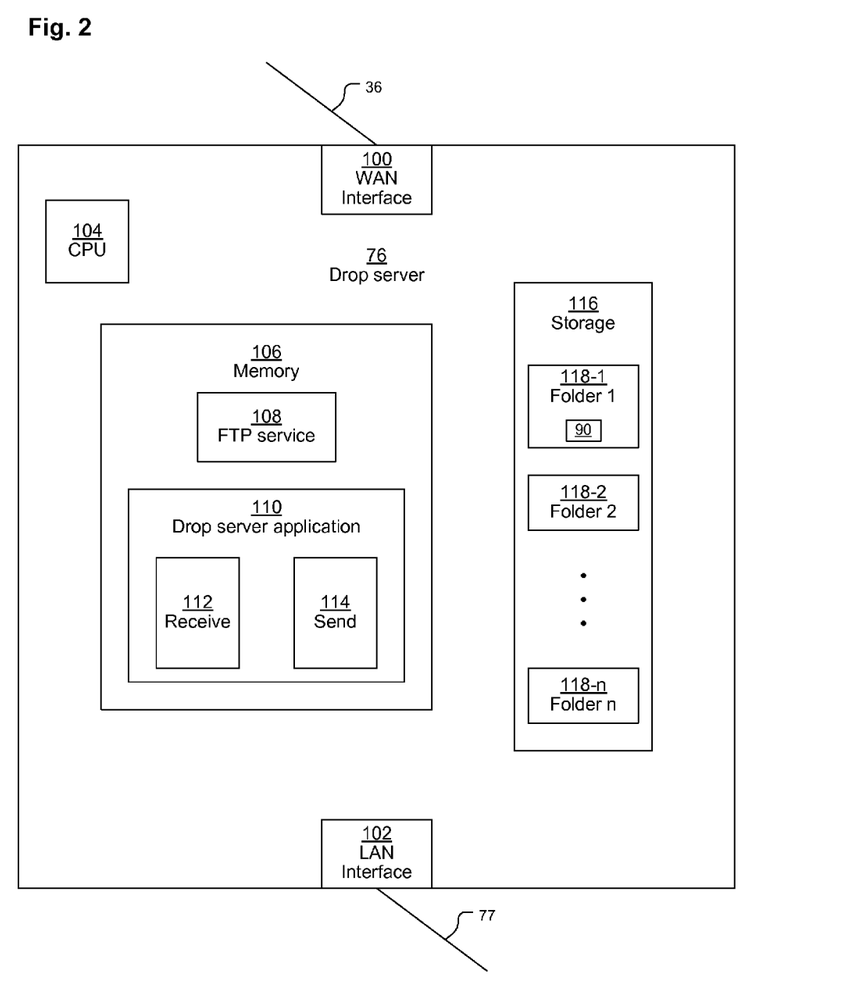
FIG. 2 illustrates an example drop server according to various embodiments.

FIG. 2 depicts drop server 76 in further detail. As depicted, drop server 76 is a computer having a WAN interface 100 for connecting to WAN 36, a LAN interface for connecting to LAN 77, a CPU 104, memory 106, and data storage 116. Memory 106 stores an FTP service 108 and a drop server application 110, both of which run on CPU 104. Drop server application 110 includes a receive module 112 for receiving files, such as content file 90 from client machine 32 and filtered file 96 from content filter server 78, and a send module 114 for sending files to content filter server 78 and client machine 32. Upon receiving content file 90 from client machine 32 via WAN interface 100 (which will be described in further detail below, in connection with FIG. 6), receive module 112 is configured to store the content file 90 in data storage 116. In some embodiments, each registered user of application 88 is assigned a unique folder (or directory) 118 (depicted as folders 118-1, 118-2, . . . , 118-$n$) within data storage 116. Thus, if user 1 sends content file 90 to drop server 76, receive module 112 stores content file 90 within folder 1 118-1, as depicted. In some embodiments, receive module 112 continually (or periodically) communicates with drop client 54 on client machine 32 in order to keep folder 1 118-1 in synchronization with drop folder 48. This periodic synchronization may be done, for example, repeatedly after the expiration of a pre-determined time period. Upon receiving a polling command from content filter server 78, send module 114 is configured to send content filter server 78 any files (e.g., content file 90) which have been newly created or updated since files were last sent to content filter server 78. In some embodiments, receive module 112 and send module 114 make use of FTP service 108 to receive and send files. Since client machine 32 and drop server 76 communicate by sending/receiving files and for synchronization, they may be said to be in functional communication with each other.

Figure 3:
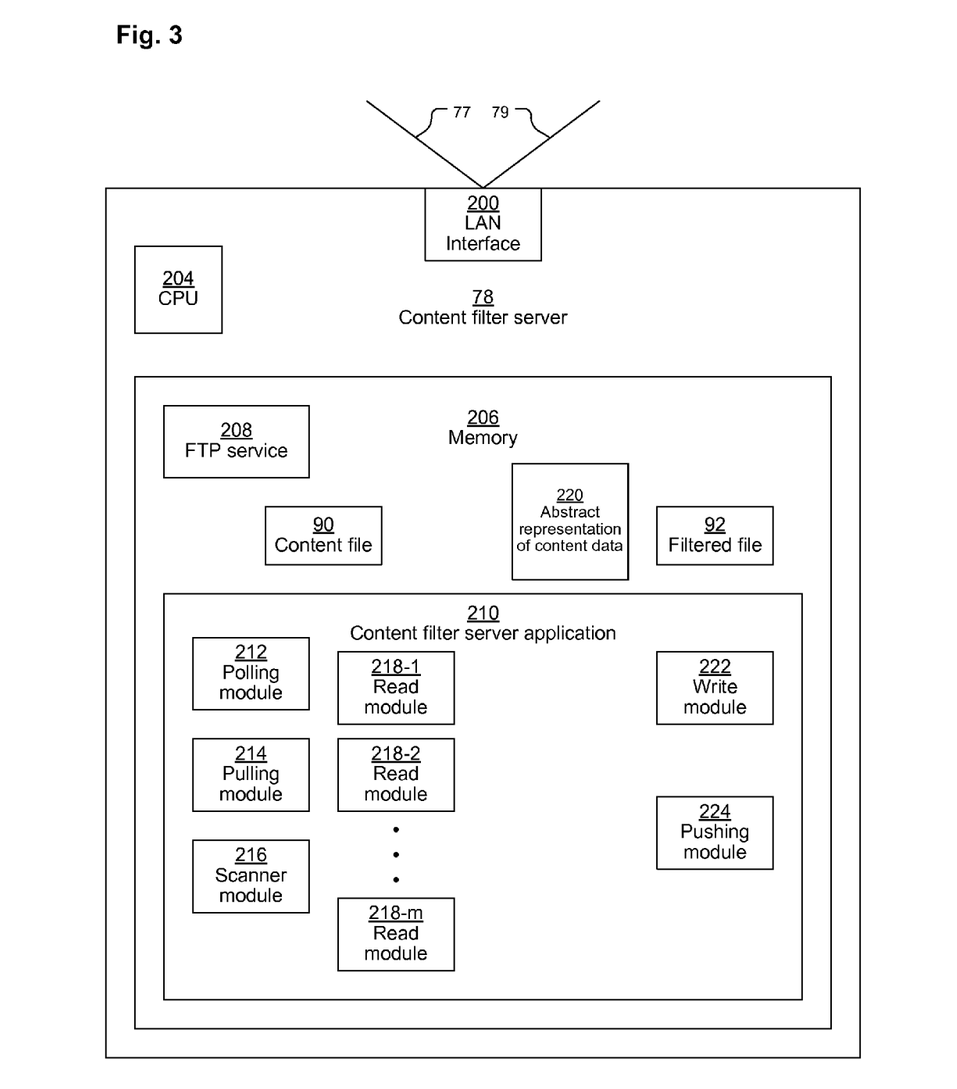
FIG. 3 illustrates an example content filter server according to various embodiments.

FIG. 3 depicts content filter server 78 in further detail. As depicted, content filter server 78 is a computer having a LAN interface 200 for connecting to LANs 77, 79, a CPU 204 and memory 206. Memory 206 stores an FTP service 208 and a content filter server application 210, both of which run on CPU 204. Content filter server application 210 includes a polling module 212, a pulling module 214, a scanner module 216 a set of read modules 218 (depicted as read modules 218-1, 218-2, . . . , 218-$m$), a write module 222, and a pushing module 224.

In operation, polling module 212 is configured to periodically poll send module 114 of drop server application 110 for new or updated files. This periodic polling may be done, for example, repeatedly after the expiration of a pre-determined time period. Upon detecting a new or updated file, e.g., content file 90, pulling module 214 is configured to send a command to drop server application 110, directing send module 114 to send the new and updated files to pulling module 214. The content file 90 may then be stored within memory 206. In some embodiments, scanner module 216 is configured to perform a scan for any malware that may be present within the content file 90, which, it should be noted, may not be secure (since it came from client machine 32, which could be infected with malware, outside the secure VM client 52 environment). In some embodiments, scanner module 216 may also perform risk-based assessments to flag unusual or uncharacteristic transactions as possibly malicious. Assuming that content file 90 is clean (i.e., no malware was detected by scanner module 216), a read module 218 reads the content file 90 and converts it into an abstract internal representation of the content data 220. For example, if content file 90 is an Excel spreadsheet containing a list of a user's financial transactions from the past 30 days (e.g., containing 100 rows, each row storing a date, amount, description, and payer/payee in a respective field), a read module 218 capable of reading Excel files reads the file and stores the underlying information in abstract representation 220. It should be understood that, in order to maintain security, each read module 218 is configured to read files without executing any macros (e.g., executable code or instructions) stored within. This limits the content filter server application 210 from being infected with malware. After read module 218 completes operation, write module 222 is configured to store the abstract representation 220 in filtered file 92 in a standardized format, such as, for example, a comma-delimited spreadsheet or database such as in comma-separated values (CSV) file format. Pushing module 224 is configured to send content file 92 to VM server 80 (or, in some embodiments, to application server 38) upon the completion of operation of write module 222. In some embodiments, pulling module 214 and pushing module 224 make use of FTP service 208 to receive and send files. Since drop server 76 and content filter server 78 communicate by sending/receiving files, they may be said to be in functional communication with each other.

Figure 4:
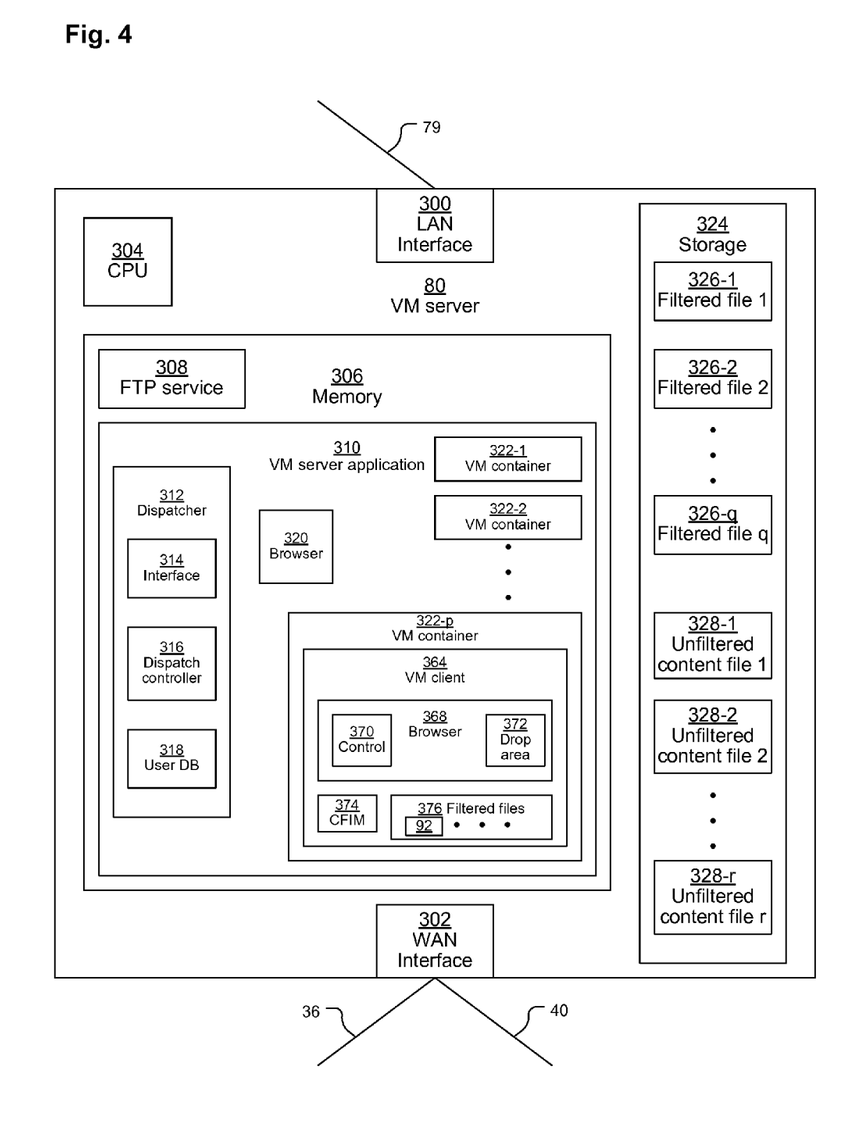
FIG. 4 illustrates an example VM server according to various embodiments.

FIG. 4 depicts VM server 80 in further detail. As depicted, VM server 80 is a computer having a LAN interface 300 for connecting to LAN 79, a WAN interface for connecting to WANs 36, 40, a CPU 304, memory 306, and data storage 324. Memory 306 stores an FTP service 308 and a VM server application 310, both of which run on CPU 304. VM server application 310 includes a dispatcher module 312, secure browser program 320, and a set of VM containers 322 (depicted as VM containers 322-1, 322-2, . . . , 322-$p$). Dispatcher module 312 controls the establishment and maintenance of VM instances 364. Within dispatcher module 312, interface 314 communicates with client terminal 52 (running on client machine 32), content filter server 78, and application 88 (running on application server 38). Once a VM session has been established with reference to per-user pre-configured settings stored in the user database 318., dispatch controller 316 runs an instance 368 of browser 320 in the context of the VM client 364 associated with that VM session to allow a user of VM client 52 to communicate with application 88. Browser instance 368 may include a control 370 (visually depicted as control 70 in FIG. 1) and a drop area 372 (visually depicted as drop area 72 in FIG. 1). VM client 364 may also contain a client file interface module (CFIM) 374, which interfaces with the file-selection dialog-box 74 within GUI 62 of FIG. 1. VM client 364 also includes a set 376 of filtered files, e.g., filtered file 92, received from content filter server 78 in association with a particular user.

Upon receiving filtered file 92 from content filter server 78 via LAN interface 300 (which will be described in further detail below, in connection with FIG. 6), dispatcher interface module 314 may be configured to temporarily store the filtered file 92 in data storage 324. Data storage 324 temporarily stores a set of filtered files 326 (depicted as filtered files 326-1, 326-2, . . . , 326-$q$). If VM client 364 for a user associated with the filtered file 92 is actively running, filtered file 92 may be stored in memory 306 within VM client 364. However, if no such VM client 324 is currently running (e.g., if the user e-mailed the content file 90 to drop server 76 or user copied the content file 90 to drop folder 48 while not running client terminal 52), the filtered file 92 is stored in non-volatile storage 324.

Since content filter server 78 and VM server 80 communicate by sending/receiving files, they may be said to be in functional communication with each other. Since client machine 32 and VM server 80 communicate by VM server 80 providing a virtual environment to client machine 32, they may be said to be in functional communication with each other. Since client machine 32 and application 88 communicate application information via a browser 368 running on VM server 80, client machine 32 and application 88 may be said to be in functional communication with each other via VM server 80.

Figure 5:
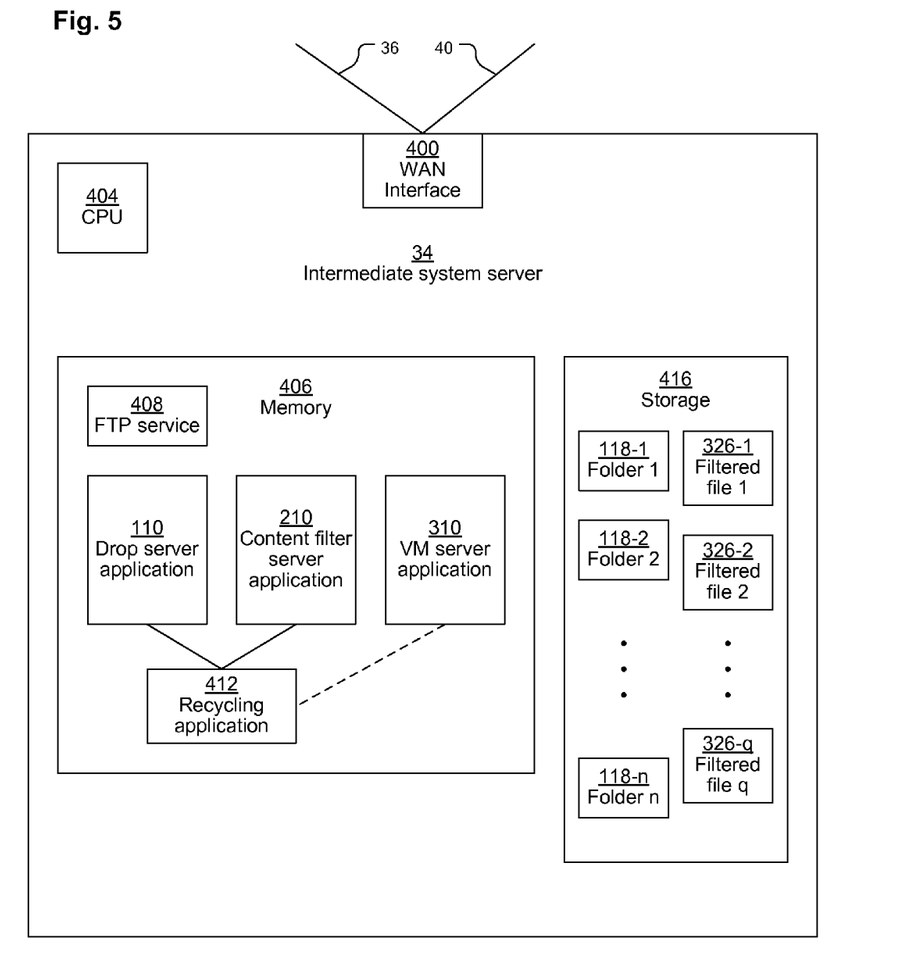
FIG. 5 illustrates an example intermediate system server according to various embodiments.

It should be understood that in some embodiments, each of drop server 76, content filter server 78, and VM server 80 are software programs operating on a single intermediate system server 34, as depicted in FIG. 5.

In FIG. 5, intermediate system server 34 is a computer having a WAN interface 400 for connecting to WANs 36, 40, a CPU 404, memory 406, and data storage 416. Memory 406 stores an FTP service 408, drop server application 110, content filter server application 210, VM server application 310, and recycling application 412, all of which run on CPU 404. Each of the drop server application 110, content filter server application 210, and VM server application 310 runs in a separate protected memory space, so that, in case one becomes infected with malware, the others are not affected. As a further precaution, in some embodiments, the various applications 110, 210, and 310 may be configured to only communicate with each other through a network connection (such as connections 36, 40) or through a virtual network connection. This functionality may be provided, for example, by the VShield program available from VMWare, Inc. of Palo Alto, Calif. As a further security precaution, in some embodiments, recycling application 412 periodically closes and restarts (or re-loads) drop server application 110 and content filter server application 210 into new separate protected memory spaces, since those applications are exposed to unsecured content file 90, which may contain malware. This periodic recycling may be done, for example, repeatedly after the expiration of a pre-determined time period. In some embodiments, such as when unsecure file downloads are permitted from the Internet, recycling application 412 also periodically closes and restarts (or re-loads) VM server application 310 into a new separate protected memory space, since that application may be exposed to unsecured requested file 94, which may contain malware. Data storage 416 further stores folders 118 for use with drop server application 110 and filtered files 326 for use with VM server application 310. In some embodiments, folders 118 and filtered files 326 are stored on physically separate disks to avoid contamination.

Figure 6:
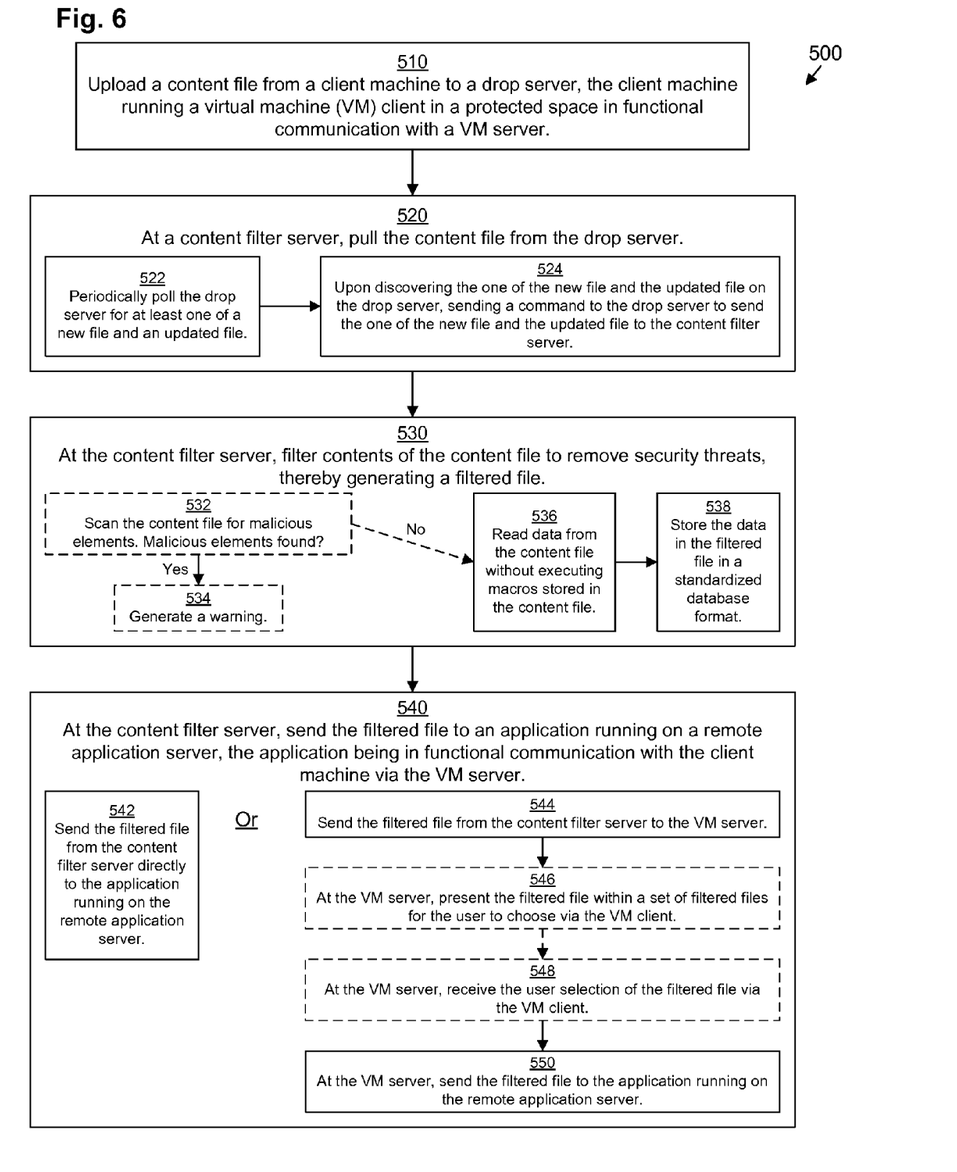
FIG. 6 illustrates an example method according to various embodiments.

FIG. 6 depicts a method 500 which illustrates the use of system 30 and its component parts to securely transmit the unsecured content file 90 to application 88.

In step 510, a user operates client machine 32 to send local file 90 to drop server 76. As mentioned, local file 90 may be any type of file resident on client machine 32. Local file 90 is considered unsecured by the system 30, because, from the perspective of application server 38, it is possible that local file 90 is infected with malware. In some embodiments, local file 90 is a spreadsheet or database file containing a list of financial transactions. It may be, for example, in Microsoft Money format, Microsoft Excel format, Intuit Quicken format, CSV format, etc.

There are several ways that the user can send local file 90 to the drop server. In some embodiments, regardless of whether the user is currently connecting to the application 88 via client terminal 52. In one such embodiment, the user e-mails the local file 90 to the drop server, using a pre-assigned e-mail address. In another such embodiment, the user sends the local file 90 to the drop server via FTP, using a pre-assigned address to connect to FTP service 108 via local FTP service 56. In another embodiment, the user copies local file 90 into drop folder 48 while drop client 54 is configured to automatically keep drop folder 48 in synchronization with a folder 118 (e.g., folder 1 118-1) on drop server 76 via interaction with receive module 112.

In other embodiments, the user sends local file 90 to drop server 76 while connected to the application 88 via client terminal 52.

In one embodiment, application 88 inserts a graphical control element 370, such as an ActiveX control, within a web page of the user interface of the application 88 for ultimate display on display 60 as control 70 (depicted as, for example, a button or a hyperlink). If the user activates control 70 (e.g., by clicking on it with a mouse), graphical control element 370 executes code which interfaces with GUI 62 via CFIM 374 to display file-selection dialog-box 74 on display 60. File-selection dialog-box 74 allows the user to view the directory structure of storage 46 on client machine 32 and prompts the user to selects a file from within the directory structure to send to drop server 76 as local file 90. Upon selection, CFIM 374 directs client machine 32 sends the selected local file 90 to drop server 76, e.g., using FTP service 56.

In another related embodiment, application 88 designates a portion of the user interface of the application 88 as a drop area 372, depicted on display 60 as drop area 72. If the user drags a graphical representation of content file 90 (e.g., an icon from within a file explorer window or a desktop) onto the drop area 72, then drop area 372 executes code which interfaces with FTP service 56 to send the content file to drop server 76.

In another related embodiment, client terminal 52 inserts button 66 into client terminal VM session window 64. Button 66, may, for example, be positioned on a toolbar within a window of client terminal VM session 64 adjacent to browser 68. If the user activates button 66 (e.g., by clicking on it with a mouse), client terminal 52 executes code which interfaces with GUI 62 to display file-selection dialog-box 74 on display 60. File-selection dialog-box 74 allows the user to view the directory structure of storage 46 on client machine 32 and prompts the user to selects a file from within the directory structure to send to drop server 76 as local file 90. Upon selection, client machine 32 sends the selected local file 90 to drop server 76, e.g., using FTP service 56.

Once the content file 90 has been uploaded to drop server 76, method 500 can proceed with step 520. In step 520, content filter server 78 pulls the content file 90 from the drop server 76. In one embodiment, in sub-step 522, polling module 212 polls the send module 114 of drop server 76 for new or updated files. Send module 114 responds by sending a list of all files which have been added or updated within folders 118 since last polled. In sub-step 524, in response to receiving the list of new and updated files at polling module 212, pulling module 214 pulls the new and updated files from the drop server 76. For example, pulling module 214 sends a command to send module 114 directing it to send at least one new or updated file (e.g., content file 90) to content filter server 78 via FTP service 108 and FTP service 208.

It should be understood that it is beneficial to configure the content filter server 78 to pull files from the drop server 76, rather than allowing the drop server 76 to push files to the content filter server 78, because it minimizes the chance that malware infecting a content file 90 will spontaneously execute on content filter server 78 to bypass security mechanisms. It should also be understood that, in some embodiments, it may be beneficial to strongly separate the content filter server 78 and the drop server 76 using strong authentication protocols to further minimize the chance that malware infecting a content file 90 will spontaneously execute on content filter server 78 to bypass security mechanisms.

Once content filter server 78 has stored content file 90 within memory, execution may proceed to step 530. In step 530, content filter server 78 filters the contents of content file 90 to remove security threats and generates filtered file 92. In some embodiments, as shown in sub-step 532, scanner module 216 performs a scan (e.g., a virus scan and/or a spyware scan) for any malware that may be present within the content file 90, which, recall, may not be secure (since it came from client machine 32, which could be infected with malware, outside the secure client terminal 52 environment). If malware is found, scanner module 216 generates a warning in sub-step 534 and further processing of content file 90 is halted. If no malware is detected, execution proceeds with sub-step 536, which is performed even if no malware scan is done. In sub-step 536, a read module 218 reads the content file 90 and converts it into an abstract internal representation of the content data 220 within memory 206. In order to maintain security, each read module 218 is configured to read files without executing any macros stored within. This tends to prevent the content filter server application 210 from being infected with malware, because only data stored within content file 90 is added to the abstract representation, without including any potentially-dangerous macros. In sub-step 538, write module 222 stores the abstract representation 220 in filtered file 92 in a standardized format, such as, for example, a comma-delimited spreadsheet or database such as in comma-separated values (CSV) file format. This same standardized format may be used regardless of the initial format that content file was written in. It is further beneficial, because it will be free of macros and malware.

Once the filtered file 92 has been stored on content filter server 78, in step 540, content filter server 78 may send the filtered file to application 88. In one embodiment, depicted as sub-step 542, pushing module 224 pushes the filtered file 92 directly to application 88 on application server 38 via WAN 40.

In another embodiment, in sub-step 544, pushing module 224 pushes the filtered file 92 to the VM server 80 via FTP services 208, 308 and interface 314. If a VM client 364 associated with the user is currently running within a VM container 322 (e.g., VM container 322-*p*), then filtered file 92 is stored within that VM client 364. Alternatively, if no VM client 364 associated with the user is currently running within any VM container 322, then filtered file 92 is stored within storage 324 for later processing, once the appropriate VM client 364 is activated.

In optional sub-step 546, dispatch controller 316 displays the set 376 of filtered files to the user on display 60. Set 376 may include only a single filtered file 92, or it may contain multiple such files. Once the user makes a selection of a particular filtered file 92 via GUI 62, interface 314 receives that selection at optional sub-step 548.

In sub-step 550, interface 314 sends the filtered file 92 (either the only one or the one selected in sub-step 548, above) to application 88 on application server 38 via FTP service 308.

Once application 88 has received the filtered file 92, it may process filtered file 92 as desired. For example, application 88 may integrate transactions listed within filtered file 92 into its internal database of user transactions. In some embodiments, once application 88 has integrated the transactions, it may display the newly-added transactions to the user via browser window 68 for the user to verify. Since browser 368 is a secure program operating on secure VM server 80, this check ensures that the content file 90 was not corrupted by an external entity.

In some embodiments, browser 368 renders all web pages provided by application 88 and sends the fully rendered images back to the client terminal 52 running on client machine 32. The fully rendered image may be a bitmap that represents what the web page is supposed to look like. The bitmap may be displayed to the user on screen 60 without further processing. This prevents any malware running on the client machine 32 from modifying the web pages sent by the application 88, since it is difficult for malware to convincingly modify a rendered page image. It also helps secure the data transmitted within the web page against eavesdropping, because it is difficult for malware to interpret data contained within a rendered page image, while it is quite easy for a human user to do so.

Data sent by the user to the application 88 can also be further protected by using keyboard re-mapping. Thus, in one embodiment, keys on a keyboard of the client machine 32 are mapped to different character than usual. Thus, when a user wishes to type "f," he hits the "q" key instead of the "f" key. Interface 314 of the VM server 80 is then able to map the "q" signal back to representing the "f" character so that the correct data can be sent to application 88. In another embodiment, interface 314 may present the user with an on-screen keyboard (in fully-rendered form for added security), thus, when the user types "f" on the on-screen keyboard (displayed on display 60), the VM client 52 sends a "q" signal to VM server 80, which interface 314 is then able to translate back to an "f" character.

After the user is done with an online banking session, or any other session with application server 38, all data collected by the VM server 80 during the session is destroyed. Therefore, no malware can be installed on the VM server 80 in normal operation and no user passwords are stored on VM server 80. This disposable character of the virtual environment ensures the security of the virtual environment, and reduces the risk of malicious intrusion into the communications between a user and the application server 38. Thus, upon the user attempting to log back into the application 88, a new VM session is established having the original pre-configured settings stored in the user database 318.

In some embodiments, it is also useful for a user to download files through virtual browser 68. For example, the user may wish to download a file stored on a secured remote application server 38, such as when interacting with a secured remote application 88. In another embodiment, the user may be using the virtual browser 68 to browse the Internet and then desire to download a file stored on an unsecured remote application server 38, such as when interacting with an unsecured remote application 88, such as a typical website.

Figure 7:
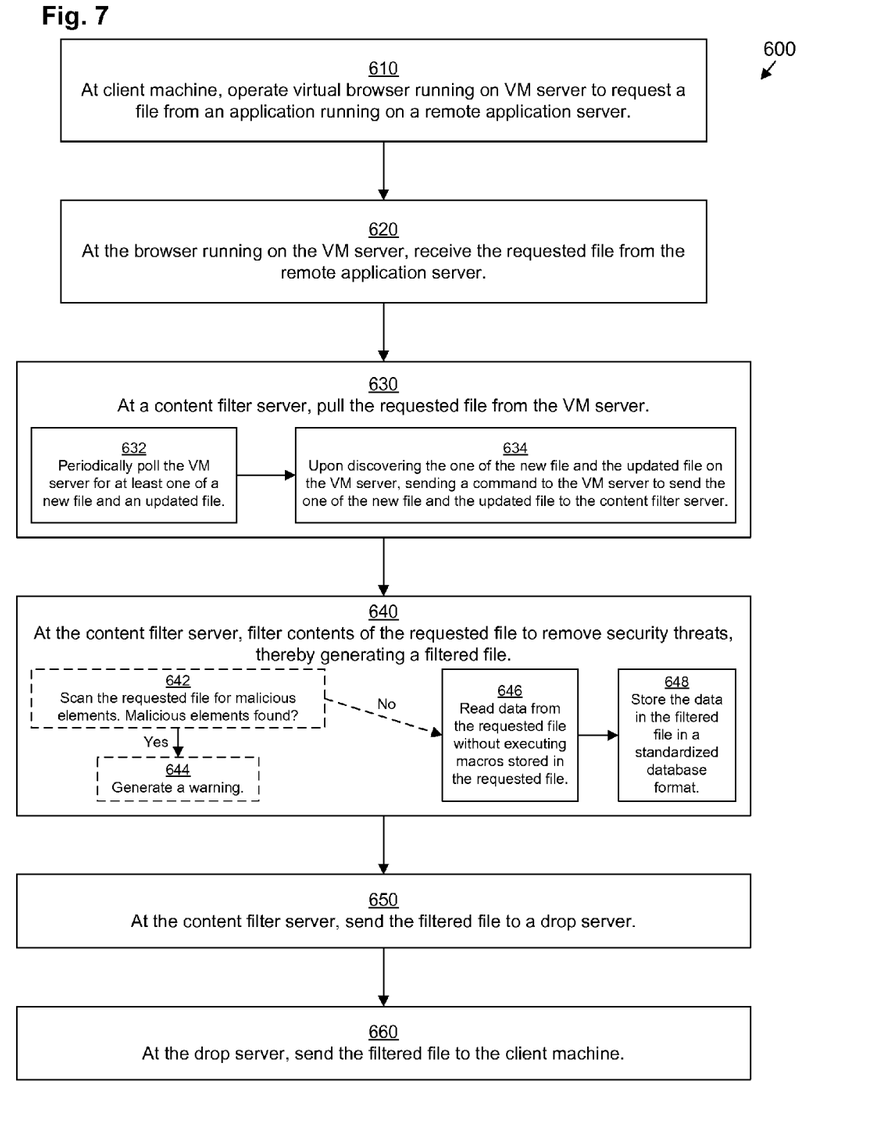
FIG. 7 illustrates an example method according to various embodiments.

Thus, FIG. 7 depicts a method 600 for downloading a file from a remote application server 38. In step 610, a user operates virtual browser 68 to direct browser 368 to request a content file 94 from application 88. In one embodiment, application 88 is a secured and trusted application running on a secure application server 38 in trusted and secured communication with VM server 80.

In another embodiment, application 88 is an unsecured or untrusted application running on an unsecure application server 38 not necessarily in trusted and secured communication with VM server 80. In some embodiments, for additional security, VM server 80 may be configured to restrict access to unsecured remote application servers 38 on the Internet for file download according to a whitelist or a blacklist, as is well-known in the art.

In step 620, browser 368 running on the VM server 80 receives the content file 94 from the remote application server 38.

In step 630, content filter server 78 pulls the content file 94 from the VM server 80. It should be understood that the operation of content filter server 78 is similar to its operation in pulling content file 90 from drop server, as described above in connection with step 520 of method 500. Thus, in one embodiment, in sub-step 632, polling module 212 polls VM server 80 for new or updated files. VM server 80 responds by sending a list of all unfiltered content files 328 which have been added or updated within storage 416 since last polled. In sub-step 634, in response to receiving the list of new and updated files at polling module 212, pulling module 214 pulls the new and updated files from the VM server 80.

It should be understood that it is beneficial to configure the content filter server 78 to pull files from the VM server 76, rather than allowing the VM server 80 to push files to the content filter server 78, because it minimizes the chance that malware infecting a content file 94 will spontaneously execute on content filter server 78 to bypass security mechanisms. It should also be understood that, in some embodiments, it may be beneficial to strongly separate the content filter server 78 and the VM server 80 using strong authentication protocols to further minimize the chance that malware infecting a content file 94 will spontaneously execute on content filter server 78 to bypass security mechanisms. In some embodiments, an additional drop server 76 may interpose between the VM server 80 and the content filter server 78 through which content file 95 must pass in order to further minimize the chance of infection through a single-directional path. In some embodiments, in order to further increase security, a plurality of content filter servers 78 may be used for various directions of travel. Thus, in one embodiment, a first content filter server 78 may be configured to pull content file 90 from drop server 76 and a second, distinct, content filter server 78 may be configured to pull content file 94 from VM server 80 (or, in some embodiments, a second drop server 76).

It should also be understood that steps 630-650 may be omitted in the case of a file download from a secured and trusted application 88 running on a secure application server 38 in trusted and secured communication with VM server 80. In that case, VM server 80 may directly send content file 94 to the drop server without need for filtering.

One content filter server 78 has stored content file 94 within memory, execution may proceed to step 640. In step 640, content filter server 78 filters the contents of content file 94 to remove security threats and generates filtered file 96. It should be understood that the operation of content filter server 78 is similar to its operation in filtering the contents of content file 90, as described above in connection with step 530 of method 500. Thus, in some embodiments, as shown in sub-step 642, scanner module 216 performs a scan (e.g., a virus scan and/or a spyware scan) for any malware that may be present within the content file 94, which, recall, may not be secure (since it came from unsecured or untrusted application 88, which could be infected with malware). If malware is found, scanner module 216 generates a warning in sub-step 644 and further processing of content file 94 is halted. If no malware is detected, execution proceeds with sub-step 646, which is performed even if no malware scan is done. In sub-step 646, a read module 218 reads the content file 94 and converts it into an abstract internal representation of the content data 220 within memory 206. In order to maintain security, each read module 218 is configured to read files without executing any macros stored within. This tends to prevent the content filter server application 210 from being infected with malware, because only data stored within content file 94 is added to the abstract representation, without including any potentially-dangerous macros. In sub-step 648, write module 222 stores the abstract representation 220 in filtered file 92 in a standardized format, such as, for example, a comma-delimited spreadsheet or database such as in comma-separated values (CSV) file format. This same standardized format may be used regardless of the initial format that content file was written in. It is further beneficial, because it will be free of macros and malware.

Once the filtered file 96 has been stored on content filter server 78, in step 650, content filter server 78 may send the filtered file 96 to drop server 76.

Once the filtered file 96 has been stored on drop server 76, in step 660, drop server 76 may send the filtered file 96 to client machine 32. In one embodiment, this step may be accomplished by automatic synchronization of a folder 118 with drop folder 48 via operation of drop client 54. In another embodiment, this step may be accomplished by FTP service 108 sending filtered file 96 to FTP service 56 by a push method.

While various embodiments of the invention have been particularly shown and described, it will be understood by those skilled in the art that various changes in form and details may be made therein without departing from the spirit and scope of the invention as defined by the appended claims.

It should be understood that browser 368 may refer to a web browser or to any other type of program used to render and display markup files in a form suitable for viewing by humans.

Furthermore, it should be understood that any time that any program or module has been described as performing an action, that action is actually performed by done by CPU on which it is operating.

Furthermore, it should be understood that although this description has mentioned FTP services 108, 208, 308 as being used for transmission of files between servers 76, 78, 80, in embodiments in which these servers 76, 78, 80 are configured as software modules operating within intermediate system server 34, these FTP services 108, 208, 308 need not be used, but rather, inter-process communication protocols may be used instead.

Furthermore, it should be understood that although FTP has been discussed, in some embodiments, other protocols for file transfer may be used instead or in addition. For example, the secure file-transfer protocol (SFTP) may be used instead for added security.

Furthermore, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

We claim:

1. A method comprising:
polling, by a content filter server, a drop server to determine the presence of a content file uploaded from a remote client machine, the remote client machine running a client terminal in functional communication with an application running on a remote application server via a VM client running in a protected space on a VM server;
directing, by the content filter server, the drop server to send the content file to the content file server;
receiving, at the content filter server, the content file from the drop server;
filtering, at the content filter server, contents of the content file to remove security threats and generate a filtered file;
sending, by the content filter server, the filtered file to the application running on the remote application server;
wherein the drop server, the content filter server, and the VM server are all independent programs being executed on a single computerized device;
wherein the single computerized device is in functional communication with the remote client machine over a first secure network connection and in functional communication with the remote application server over a second secure network connection;
wherein each of the drop server, the content filter server, and the VM server run in separate protected memory spaces on the single computerized device;
further including, at the computerized device, after expiration of a first pre-determined time period, closing the independent program of the drop server and re-loading it into a new protected memory space; and
further including, at the computerized device, after expiration of a second pre-determined time period, closing the independent program of the content filter server and re-loading it into a new protected memory space.

2. The method of claim 1 wherein filtering the contents of the content file includes:
at the content filter server, reading data from the content file without executing macros stored in the content file; and
at the content filter server, storing the data in the filtered file in a standardized database format.

3. The method of claim 1 wherein filtering the contents of the content file includes:
at the content filter server, scanning the content file for malicious elements;
at the content filter server, if malicious elements are found in the content file, then generating a warning; and
otherwise, at the content filter server:
reading data from the content file without executing macros stored in the content file; and
storing the data in the filtered file in a standardized database format.

4. The method of claim 1 wherein sending the filtered file to the application running on the remote application server includes:
sending the filtered file from the content filter server to the VM server, wherein the VM server is configured to send the filtered file to the application running on the remote application server.

5. The method of claim 4 wherein the VM server runs a browser in functional communication with the application running on the remote application server, the browser being configured to allow a user of the remote client machine to choose the filtered file from a set of filtered files resident on the VM server.

6. The method of claim 1 wherein directing the drop server to send the content file to the content file server includes:
at the content filter server, periodically polling the drop server for at least one of a new file and an updated file; and
upon discovering the one of the new file and the updated file on the drop server, sending a command from the content filter server to the drop server to send the one of the new file and the updated file to the content filter server.

7. The method of claim 1 wherein the application running on the remote application server is a financial services application in functional communication with a user of the client machine via a web browser running on the VM server.

8. The method of claim 1 wherein:
the drop server is a computerized device distinct from the remote client machine, the drop server being in functional communication with the remote client machine over a first secure network connection;
the content filter server is a computerized device distinct from the remote client machine and the drop server, the content filter server being in functional communication with the drop server;
the VM server is a computerized device distinct from the remote client machine, the drop server, and the content filter server, the VM server being in functional communication with the content filter server, the VM server also being in functional communication with the remote client machine over a second secure network connection; and
the remote application server is a computerized device distinct from the remote client machine, the drop server, the content filter server, and the VM server, the remote application server being in functional communication with the VM server over a third secure network connection.

9. The method of claim 1 wherein the method further comprises:
copying the content file to a logical storage location at the remote client machine; and
maintaining the logical storage location at the remote client machine in synchronization with a logical storage location on the drop server.

10. The method of claim 1 wherein the method further comprises, at the remote client machine:
displaying a graphical control element to a user of the remote client machine within the VM client;
receiving a notification that the user has activated the graphical control element;
in response to receiving the notification, displaying a dialog box to the user requesting that the user select a file for upload to the drop server;
receiving a command from the user to upload the content file to the drop server; and
in response to receiving the command, uploading the content file to the drop server.

11. The method of claim 1 wherein the method further comprises, at the remote client machine, the remote client machine having a graphical user interface (GUI):

receiving a notification that the user has dragged a representation of the content file onto an area of the GUI that displays the VM client; and in response to receiving the notification, uploading the content file to the drop server.

12. An apparatus comprising:
a first network interface;
a second network interface;
a controller; and
memory, the memory storing a set of instructions, which, when executed by the controller, cause the controller to:
poll a drop server to determine the presence of a content file, and direct the drop server to send the content file from the drop server across the first network interface to a content filter circuit, the content file having been uploaded to the drop server from a remote client running a client terminal in functional communication with an application running on a remote application server via a VM client running in a protected space on a VM server;
receive and filter contents of the content file at the content filter circuit to remove security threats and generate a filtered file;
send, across the second network interface, the filtered file to the application running on the remote application server;
wherein the drop server, the content filter server, and the VM server are all independent programs being executed on a single computerized device;
wherein the single computerized device is in functional communication with the remote client machine over a first secure network connection and in functional communication with the remote application server over a second secure network connection;
wherein each of the drop server, the content filter server, and the VM server run in separate protected memory spaces on the single computerized device;
wherein, the computerized device, after expiration of a first pre-determined time period, closes the independent program of the drop server and re-loads it into a new protected memory space; and
wherein, the computerized device, after expiration of a second pre-determined time period, closes the independent program of the content filter server and re-loads it into a new protected memory space.

13. The apparatus of claim 12, wherein the memory further stores instruction, which, when executed by the controller, cause the controller to, when filtering the contents of the content file:
read data from the content file without executing macros stored in the content file; and
store the data in the filtered file in a standardized database format.

14. The apparatus of claim 12, wherein the memory further stores instruction, which, when executed by the controller, further cause the controller to, when filtering the contents of the content file:
scan the content file for malicious elements;
if malicious elements are found in the content file, then generate a warning; and
otherwise:
read the data from the content file without executing macros stored in the content file; and
store the data in the filtered file in a standardized database format.

15. A computer program product comprising a non-transitory tangible storage medium storing a set of computer-readable instructions, which, when executed by a computer, cause to the computer to:
poll a drop server to determine the presence of a content file, and direct the drop server to send the content file from the drop server across a first network interface, the content file having been uploaded to the drop server from a remote client machine running a client terminal in functional communication with an application running on a remote application server via a VM client running in a protected space on a VM server;
filter contents of the content file to remove security threats and generate a filtered file;
send, across a second network interface, the filtered file to the application running on the remote application server;
wherein the drop server, the content filter server, and the VM server are all independent programs being executed on a single computerized device;
wherein the single computerized device is in functional communication with the remote client machine over a first secure network connection and in functional communication with the remote application server over a second secure network connection;
wherein each of the drop server, the content filter server, and the VM server run in separate protected memory spaces on the single computerized device;
wherein, the computerized device, after expiration of a first pre-determined time period, closes the independent program of the drop server and re-loads it into a new protected memory space; and
wherein, the computerized device, after expiration of a second pre-determined time period, closes the independent program of the content filter server and re-loads it into a new protected memory space.

16. The computer program product of claim 15 wherein the instructions, when executed by the computer, cause the computer to, when filtering the contents of the content file:
read data from the content file without executing macros stored in the content file; and
store the data in the filtered file in a standardized database format.

17. The computer program product of claim 16 wherein the instructions, when executed by the computer, cause the computer to, when filtering the contents of the content file:
scan the content file for malicious elements;
if malicious elements are found in the content file, then generate a warning; and
otherwise:
read the data from the content file without executing macros stored in the content file; and
store the data in the filtered file in a standardized database format.

18. A method comprising:
at a VM server, the VM server running a browser in a protected space in functional communication with a remote client machine, requesting a content file from an application running on a remote application server, the application being in functional communication with the client machine via the VM server;
at the VM server, receiving the content file from the remote application server;
at a content filter server, polling the VM server to determine the presence of the content file, and directing the VM server to send the content file to the content filter server;

receiving, at the content filter server, the content file, filtering contents of the content file to remove security threats, and generating a filtered file;

at the content filter server, sending the filtered file to a drop server;

at the drop server, sending the filtered file to the remote client machine;

wherein the drop server, the content filter server, and the VM server are all independent programs being executed on a single computerized device;

wherein the single computerized device is in functional communication with the remote client machine over a first secure network connection and in functional communication with the remote application server over a second secure network connection;

wherein each of the drop server, the content filter server, and the VM server run in separate protected memory spaces on the single computerized device;

further including, at the computerized device, after expiration of a first pre-determined time period, closing the independent program of the drop server and re-loading it into a new protected memory space; and further including, at the computerized device, after expiration of a second pre-determined time period, closing the independent program of the content filter server and re-loading it into a new protected memory space.

19. The method of claim 18 wherein:

the drop server is a computerized device distinct from the remote client machine, the drop server being in functional communication with the remote client machine over a first secure network connection;

the content filter server is a computerized device distinct from the remote client machine and the drop server, the content filter server being in functional communication with the drop server;

the VM server is a computerized device distinct from the remote client machine, the drop server, and the content filter server, the VM server being in functional communication with the content filter server, the VM server also being in functional communication with the remote client machine over a second secure network connection; and the remote application server is a computerized device distinct from the remote client machine, the drop server, the content filter server, and the VM server, the remote application server being in functional communication with the VM server over a third secure network connection.

* * * * *